(12) United States Patent
Suita (10) Patent No.: US 11,334,784 B2
(45) Date of Patent: May 17, 2022

(54) TIRE

(71) Applicant: Toyo Tire Corporation, Itami (JP)

(72) Inventor: Harunobu Suita, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 16/872,736

(22) Filed: May 12, 2020

(65) Prior Publication Data

US 2020/0364528 A1 Nov. 19, 2020

(30) Foreign Application Priority Data

May 17, 2019 (JP) .............................. JP2019-093947

(51) Int. Cl.
*B60C 15/06* (2006.01)
*B60C 19/00* (2006.01)
*B60C 23/00* (2006.01)
*G06K 19/077* (2006.01)
*B60C 11/24* (2006.01)
*B60C 15/04* (2006.01)
*B60C 15/00* (2006.01)

(52) U.S. Cl.
CPC ........ *G06K 19/07764* (2013.01); *B60C 11/24* (2013.01); *B60C 15/0072* (2013.01); *B60C 15/04* (2013.01); *B60C 15/0607* (2013.01); *B60C 15/0635* (2013.01); *B60C 2019/004* (2013.01)

(58) Field of Classification Search
CPC .............. B60C 19/00; B60C 2019/004; B60C 15/0072; B60C 15/0018; B60C 2015/0614; B60C 2015/0617; B60C 2015/0621; B60C 2015/0625
See application file for complete search history.

(56) References Cited

U.S. PATENT DOCUMENTS 6,116,312 A * 9/2000 Miyazono ............... B60C 15/04
152/540
6,318,431 B1 * 11/2001 Ueyoko .................... B60C 3/04
152/539

(Continued)

FOREIGN PATENT DOCUMENTS

CN         206400596 U  *  8/2017
DE   10 2017 209 541 A1   12/2018

(Continued)

OTHER PUBLICATIONS

Machine Translation: JP-55029608-A, Endo, Akira, (Year: 2021).*

(Continued)

*Primary Examiner* — Kendra Ly
(74) *Attorney, Agent, or Firm* — Maier & Maier, PLLC (57) ABSTRACT

A tire including a bead core; bead filler; upper ply; reinforcement ply which is provided to overlap a tire-radial direction inside portion of the upper ply; and down ply which overlaps a turnup part of the upper ply and reinforcement ply, and extends from an outer side in the tire-radial direction to an inner side in the tire-radial direction so as to encompass the bead core and bead filler together with the upper ply, in which an electronic component is embedded in a region of substantially triangular shape in a cross section surrounded by the turnup part of the upper ply, down ply and an end part of the reinforcement ply.

6 Claims, 4 Drawing Sheets

(56) References Cited

U.S. PATENT DOCUMENTS

| | | | |
|---|---|---|---|
| 2008/0289736 A1* | 11/2008 | Adamson | B60C 23/0493 |
| | | | 152/152.1 |
| 2016/0303921 A1* | 10/2016 | Miklic | H04B 5/0062 |
| 2017/0274710 A1* | 9/2017 | Matsumoto | B60C 15/06 |
| 2019/0300680 A1* | 10/2019 | Cho | B60C 19/00 |
| 2020/0247193 A1* | 8/2020 | Nakajima | B60C 19/00 |
| 2021/0001671 A1* | 1/2021 | Cukierman | B60C 9/02 |

FOREIGN PATENT DOCUMENTS

| | | | | |
|---|---|---|---|---|
| DE | 102017209541 A1 * | 12/2018 | | B60C 23/0493 |
| DE | 102017209545 A1 * | 12/2018 | | H01Q 1/2241 |
| JP | 55029608 A * | 3/1980 | | |
| JP | 2016-037236 A | 3/2016 | | |
| JP | 2016-049920 A | 4/2016 | | |
| JP | 2016049920 A * | 4/2016 | | |

OTHER PUBLICATIONS

Machine Translation: JP-2016049920-A, Sakai Keiichi, (Year: 2021).*
Machine Translation: DE-102017209541-A1, Broeker Benjamin, (Year: 2021).*
Machine Translation: DE-102017209545-A1, Broeker Benjamin, (Year: 2021).*
Machine Translation: CN-206400596-U, Lu Jiong, (Year: 2021).*
Search Report dated Aug. 10, 2020 in corresponding European Application No. 20174048.7; 6 pages.

* cited by examiner

TIRE

This application is based on and claims the benefit of priority from Japanese Patent Application No. 2019-093947, filed on 17 May 2019, the content of which is incorporated herein by reference.

FIELD

The present invention relates to a tire in which an electronic component is embedded.

BACKGROUND

Conventionally, the carrying out of tire production management, supply chain management, use history management, and management of tires in a state mounted to a vehicle, such as use period, travel distance, wear state, external damage, air pressure, inspection period has been proposed and implemented, by integrally embedding an RFID tag equipped with an RFID chip and antenna into a tire, or the like, and reading information stored in the RFID tag with the reader of external equipment by wireless communication.

SUMMARY

Herein, in the technology shown in Japanese Unexamined Patent Application, Publication No. 2016-37236, an RF tag is arranged between the stiffener and side rubber, and a fiber layer such as a carcass ply does not exist between the RF tag and the tire outer wall. Consequently, the RF tag moves greatly during tire deformation, and there is concern over the protection of the RF tag becoming difficult. In addition, in the technology shown in Japanese Unexamined Patent Application, Publication No. 2016-49920, a configuration is shown in which the RF tag is sandwiched between the carcass ply and cord reinforcement layer; however, due to being simply sandwiched, protection of the RF tag is not considered sufficient.

The present invention has been made taking account of the above-mentioned problem, and an object thereof is to provide a tire which effectively suppresses movement of the electronic component during tire deformation, and capable of favorably protecting the electronic component.

A tire (for example, the tire 1) according to a first aspect of the present invention includes: a bead core (for example, the bead core 21) arranged at an inside end part in a tire-radial direction (for example, the tire-radial direction Y); a bead filler (for example, the bead filler 22) which is extended from the bead core to an outer side in the tire-radial direction; an upper ply (for example, the upper ply 23) which has a main body (for example, the main body 24) extending from an outer side in the tire-radial direction to an inner side in the tire-radial direction, and a turnup part (for example, the turnup part 25) which is folded over the bead core and the bead filler, and extends to an outer side in the tire-radial direction; a reinforcement ply (for example, the chafer 31) provided to overlap a tire-radial direction inside portion of the upper ply so as to cover the main body and the turnup part of the upper ply; and a down ply (for example, the down ply 27) which overlaps the turnup part of the upper ply and the reinforcement ply, and extends from an outer side in the tire-radial direction to an inner side in the tire-radial direction so as to encompass the bead core and the bead filler together with the upper ply, in which an electronic component (for example, the RFID tag 40) is embedded in a region (for example, the region R) of substantially triangular shape in a cross section surrounded by the turnup part of the upper ply, the down ply and an end part (for example, the end part 31a) of the reinforcement ply.

According to a second aspect of the present invention, in the tire as described in the first aspect, the electronic component may be provided adjacent to the end part of the reinforcement ply.

According to a third aspect of the present invention, in the tire as described in the first or second aspect, the electronic component may be an RFID tag comprising an RFID chip and an antenna, and the RFID tag may be embedded in the region in a state covered by a protective member (for example, the protective members 43, 44).

According to an aspect of a tire according to the present invention, it becomes possible to effectively suppress movement of an electronic component during tire deformation and favorably protect the electronic component, compared to the conventional technology.

DETAILED DESCRIPTION

Hereinafter, a tire according to an embodiment of the present invention will be explained by referencing FIGS. 1 to 4.

Figure 1:
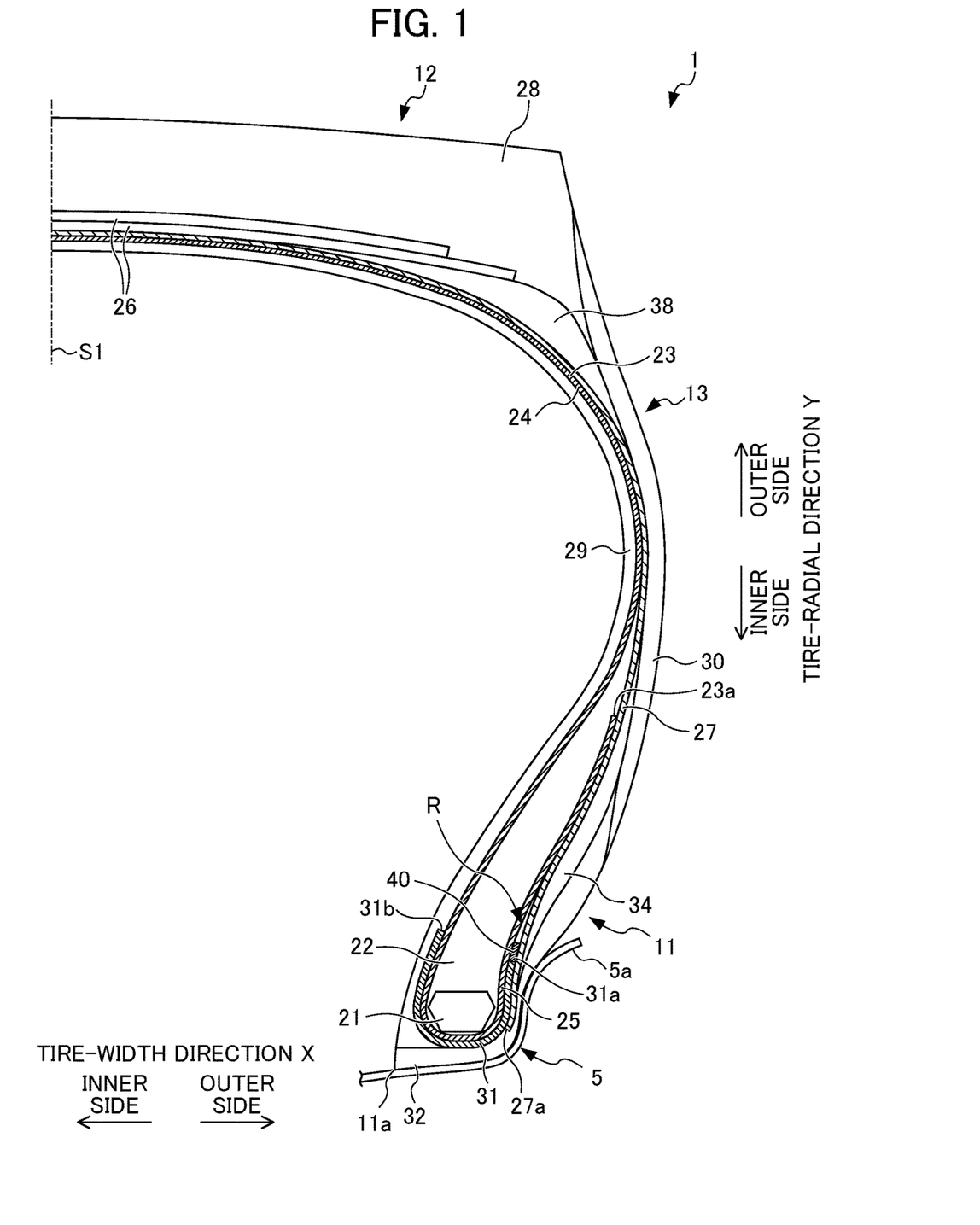
FIG. 1 is a view showing a half section in a tire-width direction of a tire according to an embodiment of the present invention.

The tire of the present embodiment, for example, is a suitable pneumatic tire to mount to a small truck or the like, and is configured by embedding an electronic component inside of the tire, as shown in FIG. 1. It should be noted that, in the present embodiment, an explanation will be made with the electronic component as an RFID tag; however, the electronic component according to the present invention may be another electronic component such as an IC tag, for example.

Herein, FIG. 1 is a tire meridian line cross-sectional view showing an example of a tire 1 of the present embodiment, i.e. is a view showing a half section in a tire-width direction of the tire 1. The specific structure of the tire according to the present embodiment is left/right symmetrical in the cross section in the tire-width direction; therefore, FIG. 1 shows a cross-sectional view of the right half. In FIG. 1, the reference symbol S1 is the tire equatorial plane. The tire equatorial plane S1 is a plane orthogonal to the tire rotation axis, and is a view positioned at the center of the tire-width direction. The tire-width direction X is a direction parallel to the tire rotation axis, and is the left/right direction of the paper plane of the cross-sectional view in FIG. 1. In addition, tire-width direction inner side is the direction approaching the tire equatorial plane S1, and is the left side in the paper plane of FIG. 1. Tire width direction outer side is a direction distancing from the tire equatorial plane S1, and is the right side in the paper plane of FIG. 1. The tire radial direction Y is a direction perpendicular to the tire rotation axis, and is the up/down direction of the paper plane in FIG. 1. In addition, tire-radial direction outer side is a direction distancing from the tire rotation axis, and is the upper side in the paper plane of FIG. 1. Tire-radial direction inner side is a direction approaching the tire rotation axis, and is the lower side in the paper plane of FIG. 1. The same also applies for FIG. 2.

Figure 2:
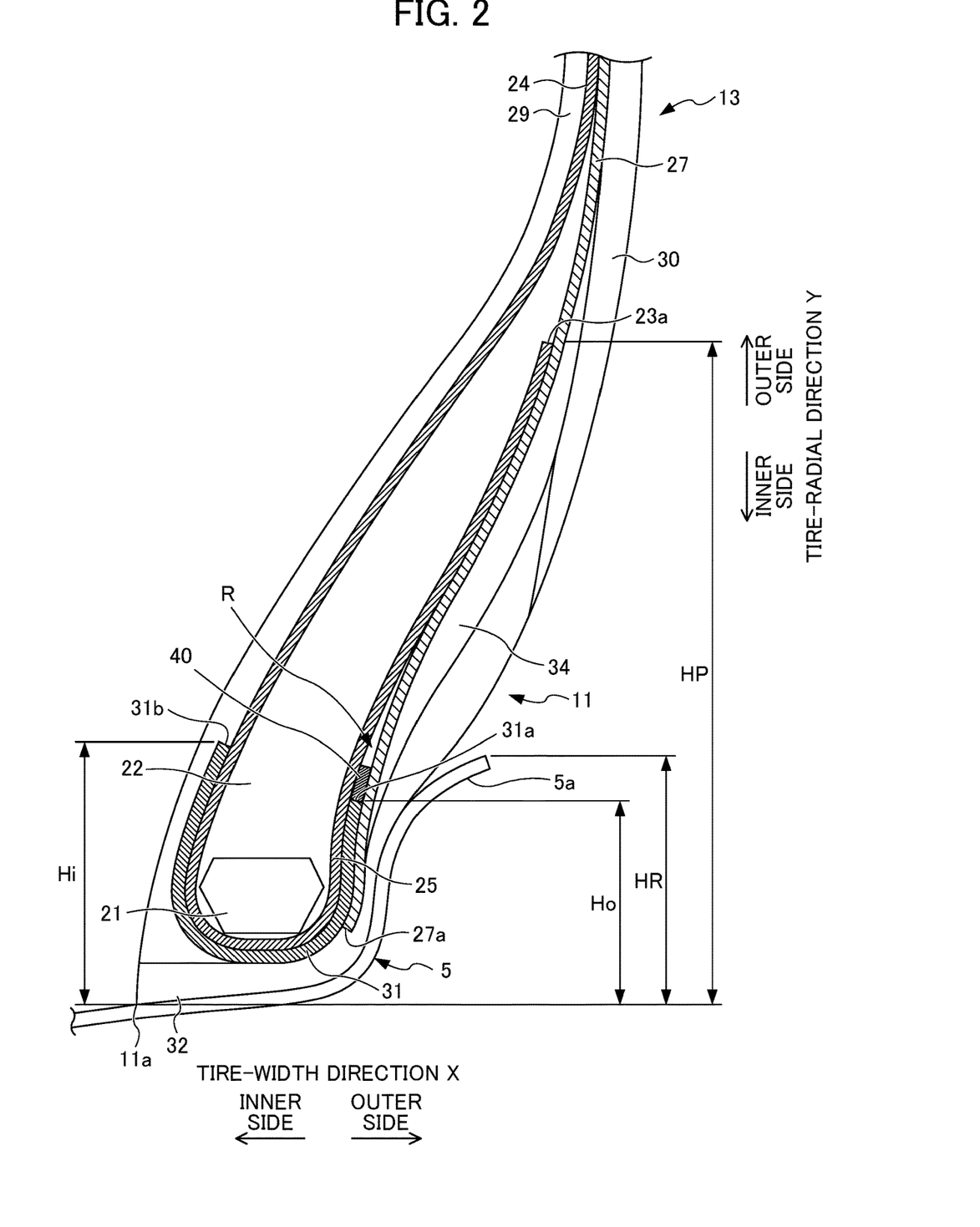
FIG. 2 is a partially enlarged cross-sectional view of a tire according to an embodiment of the present invention.

The tire 1 of the present embodiment is a suitable tire for mounting to a small truck or the like, for example, and as shown in FIGS. 1 and 2, includes: a pair of left/right beads 11 provided on both sides in the tire-width direction X and at the inner side in the tire-radial direction Y; a pair of left/right side walls 13 which extends from the inner side in the tire-radial direction Y on the side of the bead 11 to the outer side in the tire-radial direction Y to form the inner surface of the tire 1; and tread 12 which is provided so as to link the outside end parts in the tire-radial direction of the pair of left/right sidewalls 13 to form a contact patch with the road surface.

The bead 11 is configured to include: the bead cores 21 formed in a ring shape in a bundle by winding a plurality of bead wires made of metal coated with rubber, and arranged at the inside end part in the tire-radial direction Y; and bead filler 22 made of rubber which embeds the bead core 21 inside thereof and extends substantially to the outer side in the tire-radial direction Y, and is formed so as to exhibit a substantially triangular shape in a cross section of tapered tip shape.

The bead core 21 is a member for fixing the tire 1 filled with air to the rim of the wheel 5 (rim flange 5a). The bead filler 22 is a member for raising the rigidity of a bead peripheral part, and ensure high controllability and stability, and is formed using rubber of higher modulus than the rubber member at the surrounding described later in detail, for example.

Inside of the tire 1 of the present embodiment, a carcass ply (23, 27) serving as the skeleton of the tire 1 is embedded.

The carcass ply (23, 27) of the present embodiment consists of two plies of an upper ply 23 (inside carcass ply) and down ply 27 (outside carcass ply) which is made by rubber coating a plurality of ply cords arranged to extend from the side of one of the left/right beads 11 to the side of the other bead 11; and the down ply 27 (outside carcass ply). As the ply cord, it is possible to use metal cords such as steel cords; however, an organic fiber cord is preferably used such as polyester or polyamide.

The upper ply 23 includes: a main body 24 which passes from the tread 12 through the side wall 13 to reach each left/right bead 11 from the inner side in the tire-width direction X; and a winding 25 which winds around from the main body 24 to each bead 11, and folds back to the side of the side wall 13 and extends so as to encompass the bead 11 (part of the bead 11).

Herein, around the bead core 21 of the bead 11, a chafer (reinforcement ply, cord reinforcement layer) 31 formed by rubber coating a plurality of reinforcement cords is configured so as to wind around from the main body 24 on the inner side in the tire-radial direction Y of the upper ply 23 to the turnup part 25 on the outer side, and is provided to overlap so as to cover the upper ply 23 at an inside portion in the tire-radial direction Y.

The chafer 31 is arranged so that an end part (hereinafter referred as tire-width direction outside end) 31a located more to the outer side in the tire-width direction X than the bead core 21 (alternatively the bead filler 22) is located more to the outer side in the tire-width direction X than the bead core 21, and more to the inner side in the tire-radial direction Y than the rim flange 5a in a state mounting the tire 1 to the wheel 5.

The chafer 31 is arranged so that an end part (hereinafter referred as tire-width direction inside end) located more to the inner side than the tire-width direction X than the bead core 21 (alternatively the bead filler 22) is located more to the outer side in the tire-radial direction Y than the bead core 21, and more to the outer side in the tire-radial direction Y than the rim flange 5a. Furthermore, the tire-width direction outside end 31b of the chafer 31 is arranged more to the inner side in the tire-radial direction Y than the end part (winding end) 23a of the turnup part 25 of the upper ply 23, and at the inner side in the tire-width direction X.

It should be noted that the chafer 31, for example, preferably is formed to include a plurality of first reinforcement cords aligned in parallel; and a plurality of second reinforcement cords aligned in parallel at different angles than the first reinforcement cords. In addition, the first reinforcement cord and second reinforcement cord are preferable plain weave structures which slant in reverse directions to each other relative to the ply cords of the upper ply 23 and down ply 27 to intersect, and are arranged in a mesh pattern. As the reinforcement cord, it is possible to use metal cords such as steel cords; however, it is preferable to use an organic fiber cord such as polyester or polyamide.

As a specific example of the positions of the end parts 23a, 31a, 31b of the upper ply 23 and chafer 31, it is possible to show the following dimensional values. In the case of a length HR in the tire-radial direction Y from the bead toe 11a until the end part of the rim flange 5a being 17.5 mm, the length HP in the tire-radial direction Y from the bead toe 11a until the winding end 23a of the upper ply 23 is set to 30 to 40 mm, the length Ho in the tire-radial direction Y from the bead toe 11a until the tire-width direction outside end 31a of the chafer 31 is set to 10 to 17 mm, and the length Hi in the tire-radial direction Y from the bead toe 11a until the tire-width direction inside end 31b of the chafer 31 is set to 17 to 28 mm.

The upper ply 23, chafer 31 and the above-mentioned preferred respective dimensional values are in a regular state of no-load mounting the tire 1 to a regular rim and filling with regular internal pressure. Regular rim is a rim 5a for which the standard is decided for every tire, in a specification system including the standard on which the tire 1 is based, and indicates a "standard rim" in the JATMA standard, "Design Rim" in the TRA standard, and "Measuring Rim" in the ETRTO standard. In addition, regular internal pressure is the air pressure decided by each standard for every tire in the specification system including the standard on which the tire 1 is based, and indicates "maximum air pressure" in the JATMA standard, the maximum value described in "TIRE LOAD LIMITS AT VARIOUS COLD INFLATION PRESSURES" in the TRA standard, and "INFLATION PRESSURE" in the ETRTO standard.

The down ply 27 is provided to overlap the end part 27a side on the inner side in the tire-radial direction Y with the chafer 31 and the turnup part 25 of the upper ply 23 arranged on the outer side in the tire-width direction X, and to extend from the outer side in the tire-radial direction Y to the inner side in the tire-radial direction Y so as to encompass each bead 11 along with the upper ply 23. The down ply 27 is embedded inside of the tire 1, by arranging to laminate the tread 12 from a side of one side wall 13 and a portion on the side of the other side wall 13, on the outside of the main body 24 of the upper ply 23.

In addition, with the down ply 27, the end part 27a on the inner side in the tire-radial direction Y is arranged more to the inner side in the tire-radial direction Y than the center of the bead core 21. It should be noted that center of the bead core 21 indicates the center of gravity in a cross section of the bead core 21. Alternatively, it indicates the central position in the tire-width direction X of a cross section of the bead core 21, and the central position in the tire-radial direction Y.

The sidewall 13 is configured to include side-wall rubber 30 which is provided on both sides in the tire-width direction X of the down ply 27, and form the side surface (outside wall surface) of the tire 1.

The tread 12 is configured to include a belt 26 embedded in the outer side in the tire-radial direction (tire outer surface side) of the down ply 27; a belt lower pad 38 installed between both end parts in the tire-width direction X of the belt 26 and the down ply 27; and tread rubber 28 which embeds the belt 26 while being installed on the outer side in the tire-radial direction Y from the belt 26, and in which the outer surface forms a contact area. It should be noted that the belt 26, for example, is formed by covering with rubber a plurality of cords such as steel cords, and is for reinforcing the tread 12 at the outer circumference of two carcass plies (23, 27).

In addition, at the inner side in the tire-width direction X (tire inner surface side) of the upper ply 23, an inner liner 29 serving as an air impermeable rubber layer forming the inner circumferential surface of the tire 1 is provided.

Furthermore, at the tire outer surface side of the chafer 31 and down ply 27 provided to the bead 11, the reinforcement rubber (reinforcement rubber layer) 32 is provided. In the reinforcement rubber 32, the upper part thereof contacts with the lower part of the side-wall rubber 30, and the lower part thereof is installed to wrap around the inner side in the tire-radial direction Y from the bead core 21. The reinforcement rubber 32 thereby comes into contact with the rim of the wheel 5 (rim flange 5a) at the outer side in the tire-width direction X and inner side in the tire-radial direction Y of the bead core 21.

The rubber constituting the reinforcement rubber 32 has a higher modulus during 100% extension than the rubber constituting the side-wall rubber 30, and preferably is a modulus during 100% extension that is 2 to 3 times that of the rubber constituting the side-wall rubber 30. For example, in the case of the modulus during 100% extension of the sidewall rubber 30 being 1.2 to 2.2 MPa, the modulus during 100% extension of the reinforcement rubber 32 is preferably set to 3.5 to 4.5 MPa. It should be noted that the modulus indicates the 100% extension modulus (M100) under an atmosphere of 23° C. measured in accordance with "3.7 Predetermined elongation tensile stress (Stress at a given elongation), S" of JIS K6251:2010.

Between the down ply 27 and reinforcement rubber 32, cushion rubber (cushion rubber layer) 34 is provided. Since the reinforcement rubber 32 is arranged at the outer side in the tire-width direction X of the cushion rubber 34, the cushion rubber 34 will not be exposed at the tire outer surface, and not come into contact with the rim.

The cushion rubber 34 has a modulus which is equal or no more than the modulus of the bead filler 22, and more preferably is a modulus of at least 85% and no more than 90% of the modulus of the bead filler 22. It should be noted that the modulus indicates the 100% elongation modulus (M100) under an atmosphere of 23° C. measured in accordance with "3.7 Predetermined elongation tensile stress (Stress at a given elongation), S" of JIS K6251:2010.

(A) Then, in the tire 1 of the present embodiment configured in the above-mentioned way, the tire-width direction outside end 31a of the chafer (reinforcement ply) 31 is located more to the outer side in the tire-radial direction Y than the bead core 21, the tire-width direction inside end 31b of the chafer 31 is located more to the outer side in the tire-radial direction Y than the bead core 21, and located more to the outer side in the tire-radial direction Y than the end part of the rim flange 5a.

The tire 1 of the present embodiment thereby has the chafer 31 arranged so as to cover the entirety from the outer side of the upper ply 23 to the inner side in the tire-radial direction Y of the bead core 21, and a superior reinforcing effect around the bead core 21 is exhibited by this chafer 31.

(B) The tire 1 of the present embodiment has the tire-width direction outside end 31a of the chafer 31 located more to the inner side in the tire-radial direction Y than the end part of the rim flange 5a, and opposingly arranged in the tire-width direction X with the rim flange 5a in a state mounting the tire 1 to the wheel 5.

In the tire 1 of the present embodiment, the tire-width direction outside end 31a of the chafer 31 is sandwiched between the rim flange 5a and the bead core 21 or bead filler 22, and can thereby suppress motion of the tire-width direction outside end 31a of the chafer 31 occurring during tire deformation by the rim flange 5a. Consequently, it is possible to curb shear strain generating between the chafer 31 and the upper ply 23 or down ply 27 arranged to overlap, and thus is a tire 1 equipped with superior durability.

(C) In the tire 1 of the present embodiment, the tire-width direction inside end 31b of the chafer 31 is located more to the outer side in the tire-radial direction Y than the end part of the rim flange 5a.

The tire 1 of the present embodiment, upon assembling the tire 1 to the rim of the wheel 5, or removing from the rim, can thereby protect the entire location which tends to rub with the rim flange 5a of the upper play 23 by covering by the chafer 31. Consequently, it is possible to curb damage of the upper ply 23 upon assembly to the rim and upon removal from the rim, and thus is a tire 1 superior in protection performance of the upper ply 23.

(D) In the tire 1 of the present embodiment, the winding end 23a of the upper ply 23 is located more to the outer side in the tire-radial direction Y than the rim flange 5a.

It is thereby possible to prevent the collapse of the bead filler 22 to the tire-width direction X, and possible to enhance the durability of the tire 1.

(E) The tire 1 of the present embodiment can enhance the reinforcing effect by the chafer 31, by way of the chafer 31 being configured by a plain weave structure arranging the first reinforcement cord and second reinforcement cord in a mesh.

In particular, in the case of the chafer 31 being configured by slanting the first reinforcement cord and second reinforcement cord in opposite directions from each other relative to the ply cords of the upper ply 23 and down ply 27 to intersect, the tension generated at the first reinforcement cord and second reinforcement cord acts from two directions on the upper ply 23 and down ply 27 to cancel each other.

A phenomenon called ply cord wave in which the ply cord provided along the tire-width direction X bends to the tire-circumferential direction thereby hardly occurs, and it is possible to drastically enhance the durability of the bead 11.

On the other hand, in the tire 1 of the present embodiment, the RFID tag (electronic component 40) is integrally embedded.

Figure 3A:
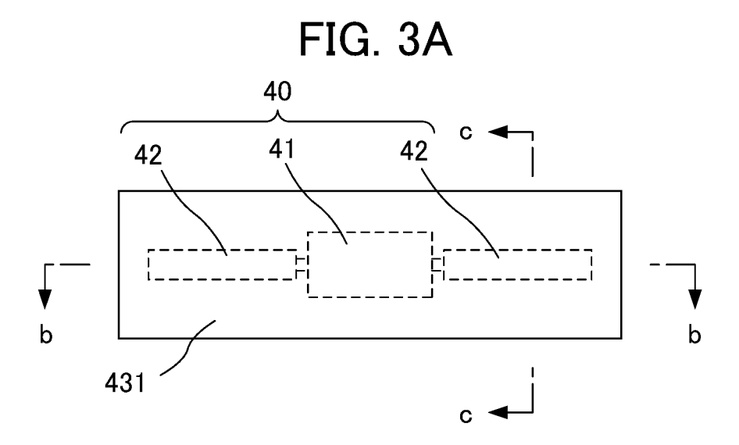
FIG. 3A is a view showing an RFID tag embedded in a tire according to an embodiment of the present invention, and is a view showing the RFID tag in a state protected by a protective member.
Figure 3B:
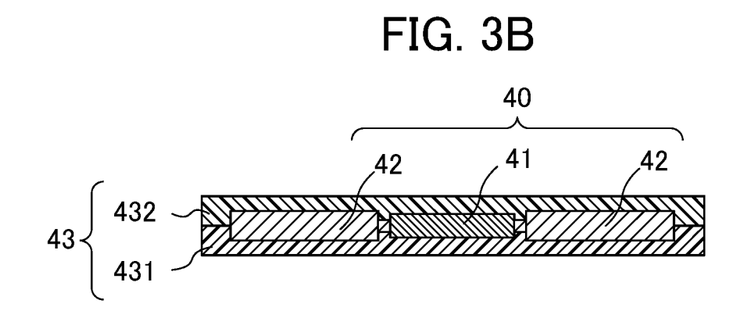
FIG. 3B is a view showing a cross-section along the line b-b in FIG. 3A.
Figure 3C:
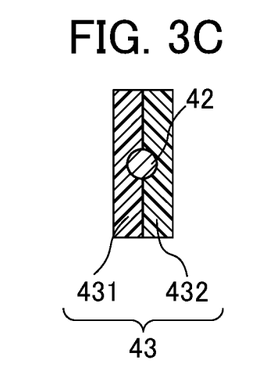
FIG. 3C is a view showing a cross-section along the line c-c in FIG. 3C.

The RFID tag 40 of the present embodiment, for example, is a passive radiofrequency identification transponder equipped with an RFID chip 41 and antenna 42 for performing communication with external equipment as shown in FIGS. 3A to 3C, and by reading the information stored in the RFID chip 41 by the reader of external equipment, enables production management of the tire 1, supply chain management, use history management, and management of tires 1 in a state mounted to a vehicle, such as use period, travel distance, wear state, external damage, air pressure, and inspection period.

It should be noted that, as the antenna 42, various types of antennas such as a coil-shaped spring antenna, plate-shaped antenna, and rod-shaped antenna can be used. For example, it may be an antenna formed by printing a predetermined pattern on a flexible substrate.

In addition, in the present embodiment, the RFID tag 40 is covered by a protective member 43 (431, 432), and is embedded inside of the tire 1 in this state.

For example, the protective member 43 (431, 432) is configured by two rubber sheets which sandwich to protect the RFID tag 40. This rubber sheet may be configured from raw rubber prior to vulcanization, for example. This protective member 43 (431, 432) is configured from rubber of a predetermined modulus. Herein, the modulus indicates the 100% elongation modulus (M100) under an atmosphere at 23° C. measured in accordance with "3.7 Stress at a given elongation, S" of JIS K6251:2010.

The protective member 43 (431, 432) preferably uses rubber having a modulus at least higher than the side-wall rubber 30. For example, as the rubber used in the protective member 43 (431, 432), based on the modulus of the side-wall rubber 30, it is more preferable to use rubber of 1.1 to 2 times this.

The protective member 43 may be configured from short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber filler into the rubber, it is possible to raise the strength of the rubber.

As the protective member 43, a rubber sheet in the state after vulcanization may be used. The rubber sheet in the state after vulcanization can suitably protect the RFID tag 40 due to not plastically deforming as would raw rubber.

In addition, as the protective member 43, an organic fiber layer may be provided by polyester fibers, polyamide fibers, or the like. It is also possible to embed organic fiber layers in the two rubber sheets 431, 432.

In this way, if configuring the protective member 43 by two rubber sheets, since it is possible to thinly form the RFID tag 40 including the protective member 43, it is suitable upon embedding in the tire 1. In addition, when assembling the RFID tag 40 to the constituent members of the tire 1 prior to vulcanization, the RFID tag 40 covered by rubber sheets can be attached very easily.

However, the protective member 43 is not limited to a form configured by two rubber sheets, and can adopt various forms. For example, the protective member 43 may be provided to only one side of the RFID tag 40. In the case of providing the protective member 43 to only one side of the RFID tag 40, it is possible to make the overall thickness thinner. If the rubber sheets constituting the protective member is covering at least part of the RFID tag 40, effects such as an improvement in workability in the manufacturing process, stress mitigation, etc. can be obtained.

In addition, for example, it may be a configuration winding one rubber sheet over the entire circumference of the RFID tag 40, or a configuration attaching a protective member in the form of a potting agent having high viscosity over the entire circumference of the RFID tag 40. Even if such a configuration, it is possible to suitably protect the RFID tag 40.

Figure 4A:
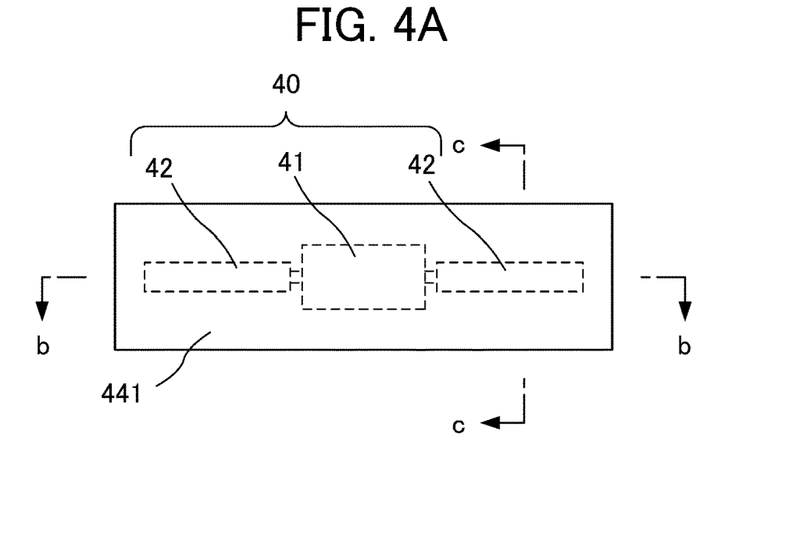
FIG. 4A is a view showing an RFID tag embedded in a tire according to an embodiment of the present invention, and is a view showing an RFID tag in a state protected by a protective member.
Figure 4B:
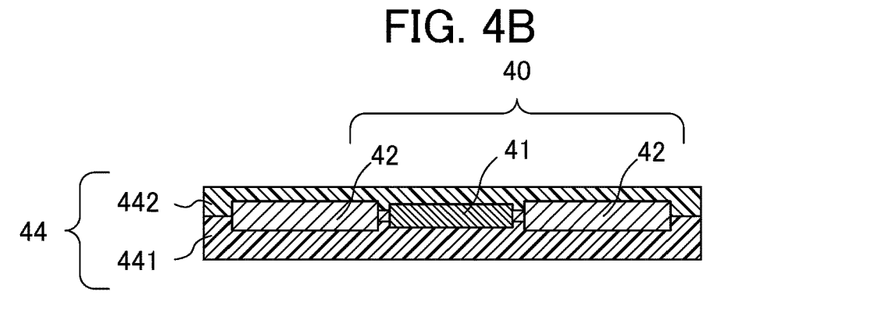
FIG. 4B is a view showing a cross-section along the line b-b in FIG. 4A.
Figure 4C:
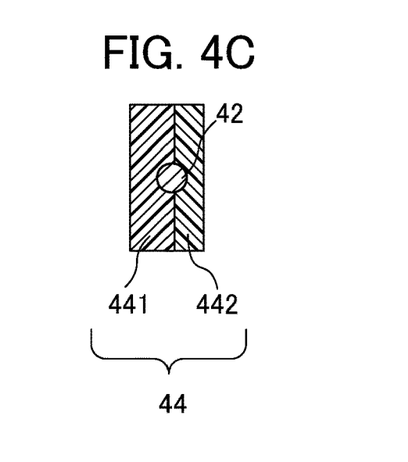
FIG. 4C is a view showing a cross-section along the line c-c in FIG. 4C.

Furthermore, as shown in FIGS. 4A to 4C, the thickness of the two rubber sheets of the protective member 44 covering the RFID tag 40 may be changed. For example, one rubber sheet 411 on the side strongly pressed during vulcanization and during use may be formed thicker than the other rubber sheet 442, and may be configured so as to be able to reliably and strongly protect the side on which great pressing force (stress) acts.

It should be noted that the RFID tag (electronic component) 40 may not necessarily be embedded inside of the tire 1 by establishing in a state covered by the protective members 43, 44. In other words, as a matter of course, it will not be a problem even if not providing the protective members 43, 44 and arranging inside of the tire 1 in a state of only the RFID tag 41 and antenna 42.

Then, in the tire 1 of the present embodiment, the above such RFID tag 40 is provided by arranging within the rubber of region R exhibiting a substantially triangular cross-section in a tapered tip shape surrounded by the turnup part 25, down ply 27 and chafer 31 (tire-width direction outside end 31a of the chafer 31).

By arranging the RFID tag 40 in the region R surrounded by the two plies of the upper ply 23 and down ply 27, and the chafer 31 of reinforcement ply in this way, it is possible to effectively suppress motion during tire 1 deformation of the RFID tag 40, and thus becomes possible to suitably protect.

In other words, the tire 1 of the present embodiment is the configuration described in the aforementioned (A) to (E) and a tire 1 achieving operational effects from such a configuration, and by providing the RFID tag 40 in the region R surrounded by the two plies of the turnup part 25 of the upper ply 23 and the down ply 27 and the chafer 31 of such a tire 1, it becomes possible to protect the RFID tag 40 using the operational effects described in the aforementioned (A) to (E).

In addition, by providing the RFID tag in the region R surrounded by the upper ply 23, down ply 27 and chafer 31, and being arranged from the outer surface side of the tire 1 to be layered in the order of the chafer 31 of the reinforcement ply, cushion rubber 34, down ply 27, RFID tag 40 and upper ply 23, and particularly by the cushion rubber 34 being provided between the reinforcement rubber 32 and the region R in which the RFID tag 40 is provided in the tire-width direction X, it is possible to effectively suppress movement during tire deformation of the RFID tag 40, and thus becomes possible to more suitably protect the RFID tag 40.

In addition, by providing the RFID tag 40 so as to adjacent to the tire-width direction outside end 31a of the chafer 31 in the region R surrounded by the upper ply 23, down ply 27 and chafer 31, it is possible to suppress movement during tire deformation of the RFID tag 40 more effectively. In other words, it becomes possible to more suitably protect the RFID tag 40.

Therefore, according to the tire 1 of the present embodiment, it becomes possible to drastically improve the durability of the RFID tag 40 embedded inside of the tire 1.

In addition, in the tire 1 of the present embodiment, by providing the RFID tag 40 in the region R surrounded by the upper ply 23, down ply 27 and chafer 31, and being able to suitably protect the RFID tag 40, it is possible to ensure the desired protection performance, even in a case of not covering the RFID tag 40 by the protective members 43, 44.

Although an embodiment of a tire according to the present invention has been explained above, the present invention is not to be limited to the above-mentioned embodiment, and modifications are possible where appropriate within a scope not departing from the gist of the present invention.

What is claimed is:

1. A tire, comprising:
   a bead core arranged at an inside end part in a tire-radial direction;
   a bead filler which is extended from the bead core to an outer side in the tire-radial direction;
   an upper ply which has a main body extending from the outer side in the tire-radial direction to an inner side in the tire-radial direction, and a turnup part which is folded over the bead core and the bead filler, and extends to the outer side in the tire-radial direction;
   a reinforcement ply provided to overlap an inside portion in the tire-radial direction of the upper ply so as to cover the main body and the turnup part of the upper ply; and
   a down ply which overlaps the turnup part of the upper ply and the reinforcement ply, and extends from the outer side in the tire-radial direction to the inner side in the tire-radial direction so as to encompass the bead core and the bead filler together with the upper ply, wherein an electronic component is positioned in a region which is in direct contact with each of an axially outer surface of the turnup part of the upper ply, an axially inner surface of the down ply, and a radially outer end of the reinforcement ply.

2. The tire according to claim 1, further comprising:
   a cushion rubber provided at an outer side of the down ply in the tire-width direction that extends to the outer side in the tire-radial direction.

3. The tire according to claim 2, further comprising:
   a reinforcement rubber provided at an outer side of the cushion rubber in the tire-width direction that extends to an inner side of the bead core in the tire-radial direction.

4. The tire according to claim 2, wherein a modulus of the cushion rubber is equal or no more than a modulus of the bead filler.

5. The tire according to claim 1, wherein the electronic component is an RFID tag comprising an RFID chip and an antenna, and the RFID tag is positioned in the region in a state covered by a protective member.

6. The tire according to claim 5, wherein a modulus of the protective member is higher than a modulus of the side-wall rubber.

* * * * *